| United States Patent [19] | [11] | 4,371,586 |
|---|---|---|
| Dages | [45] | Feb. 1, 1983 |

[54] PLASTICIZERS FOR POLYVINYL BUTYRAL

[75] Inventor: Daniel Dages, Les Mureaux, France

[73] Assignee: Saint-Gobain Vitrage, Neuilly sur Seine, France

[21] Appl. No.: 294,415

[22] Filed: Aug. 19, 1981

[30] Foreign Application Priority Data

Sep. 1, 1980 [FR] France .............................. 80 18862

[51] Int. Cl.$^3$ ........................ B32B 17/10; B32B 27/42
[52] U.S. Cl. ...................................... 428/437; 524/295
[58] Field of Search ................. 260/31.8 W; 524/295; 428/437

[56] References Cited

U.S. PATENT DOCUMENTS

| 3,841,890 | 10/1974 | Coaker et al. | 106/316 |
|---|---|---|---|
| 3,841,955 | 10/1974 | Coaker et al. | 161/199 |
| 3,884,865 | 5/1975 | Fariss et al. | 260/31.8 R |
| 4,144,217 | 3/1979 | Snelgrove et al. | 260/31.8 W |
| 4,243,572 | 1/1981 | Dagés | 428/437 |

FOREIGN PATENT DOCUMENTS 2007677  5/1979  United Kingdom .

OTHER PUBLICATIONS

Special Plastics Manufacturing Handbook, '78/'79, Articles, pp. 253, 256.

*Primary Examiner*—Joseph L. Schofer
*Assistant Examiner*—N. Sarofim
*Attorney, Agent, or Firm*—Pennie & Edmonds

[57] ABSTRACT

This invention relates to a novel group of plasticizers for polyvinyl butyral wherein the plasticizer comprises a mixture of at least one alkyl alkylaryl adipate and at least one dialkyl adipate in which the alkyl group contains 3 to 8 carbon atoms.

19 Claims, No Drawings

PLASTICIZERS FOR POLYVINYL BUTYRAL

TECHNICAL FIELD

This invention relates to a novel group of plasticizers for polyvinyl butyral wherein the plasticizer comprises a mixture of at least one alkyl alkylaryl adipate and at least one dialkyl adipate in which the alkyl group contains 3 to 8 carbon atoms.

BACKGROUND ART

Plasticized polyvinyl butyral is widely used as an interlayer or insert in the laminated safety glass used particularly in automobiles or building constructions. The laminated safety glass used for these purposes should exhibit certain properties such as good edge stability, heat resistance, and resilience, particularly at low ambient temperatures. The plasticized polyvinyl butyral interlayer determines the degree to which these desired properties are exhibited by the laminated safety glass.

The edge stability, or resistance to delamination of the laminated safety glass, is directly linked to the compatibility of the plasticizer with the polyvinyl butyral resin (PVB). Incompatibility of the plasticizer and the PVB resin results in the exudation of the plasticizer from the plasticized polyvinyl butyral sheet and subsequent delamination of the laminated glass.

The use of mixed alkyl alkylaryl adipates as PVB plasticizers is known in the prior art, European Pat. No. 11577. These adipates are generally represented by the following structural formula:

wherein n is greater than or equal to 1 and the sum of p+r is greater than or equal to 1.

Typical mixed adipates of this formula are benzyl octyl adipate, benzyl hexyl adipate, benzyl butyl adipate and benzyl decyl adipate.

These adipates are suitable plasticizers for a PVB resin having a molecular weight of 30,000 to 600,000, comprising 0 to 10% by weight of residual ester groups, calculated as polyvinyl acetate and 12 to 25% by weight of hydroxyl groups, calculated as polyvinyl alcohol. Mixed adipates of this type demonstrate a good compatibility with the PVB resin. Thus, laminated glasses containing these plasticized polyvinyl interlayers exhibit good mechanical properties and have excellent edge stability and good heat resistance. For certain uses, however, these mixed adipate plasticized polyvinyl butyral interlayers fail to provide the laminated safety glass with adequate cold resistance and particularly cold resilience.

The use of dialkyl adipates, such as dibutyl adipate, di-n-pentyl adipate, di-n-heptyl adipate and di-n-octyl adipate as PVB plasticizers is also known. These plasticizers exhibit only a partial compatibility with the PVB resin that decreases as the molecular weight of the adipate and/or the hydroxyl group content of the PVB resin increases. Thus, plasticizers of this type are effective only if they consist of small molecular weight dialkyl adipates or if the PVB resin has a low hydroxyl group content. Under these circumstances, the heat resistance and/or the edge stability of the laminated glass containing these plasticizers is unsatisfactory.

GENERAL DESCRIPTION OF THE INVENTION

This invention is aimed at eliminating the limitations imposed by the use of the plasticizers of the prior art.

The PVB plasticizer provided by this invention is a mixture comprising (1) at least one mixed alkyl alkylaryl adipate of the general formula:

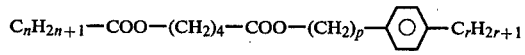

wherein n is greater than or equal to 1 and the sum of p+r is greater than or equal to 1 and (2) at least one dialkyl adipate in which the alkyl group contains 3 to 8 carbon atoms.

The plasticizer mixture of this invention permits the formation of a plasticized PVB which, when used as an interlayer in the laminated safety glass of automobiles or buildings, for example, improves the cold resistance and particularly the cold resilience of the glass, while providing good edge stability and heat resistance.

The improved cold resilience permitted by the use of this plasticizer mixture is unexpected since it is known that a mixture of plasticizers generally achieves a level of cold resilience that is between that achieved by each of the plasticizers when used separately. For example, a mixture of di-n-hexyl adipate and butyl benzyl phthalate provides a level of cold resilience that represents the difference between the respective resiliences obtained by using the plasticizers individually. (see Table 1, Examples 2, 4, 7.)

DESCRIPTION OF THE PREFERRED EMBODIMENTS

The mixed alkyl alkylaryl adipate component of the plasticizers used in this invention is represented by the structural formula:

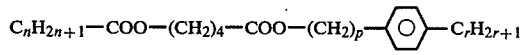

wherein n is greater than or equal to 1 and the sum of p+r is greater than or equal to 1. Particularly suitable mixed adipates of the above formula are benzyl octyl adipate, benzyl hexyl adipate, benzyl butyl adipate and benzyl decyl adipate.

Preferred dialkyl adipate components of the plasticizers include dibutyl adipate, di-n-pentyl adipate, di-n-hexyl adipate and di-n-heptyl adipate.

Under one advantageous embodiment of the invention, the mixed alkyl alkylaryl adipate content of the plasticizer mixture is between about 10 to 90%, and the dialkyl adipate content is between about 90 to 10%.

Polyvinyl butyral resins that can be plasticized according to this invention have a molecular weight of 30,000 to 600,000, a 0 to 10% content by weight of residual ester groups, calculated as polyvinyl acetate and a 12 to 25% content by weight of hydroxyl groups, calculated as polyvinyl alcohol.

Preferably, the residual ester group content of the PVB resin is less than 5%, and the PVB resin is prepared according to the method described in French Pat. No. 2,401,941, the disclosure of which is hereby incorporated by reference.

The test methods used to demonstrate the advantages of this invention are described below.

The PVB resins used in the tests were prepared according to the method of French Pat. No. 2,401,941.

Plasticized polyvinyl butyral was obtained by mixing PVB resin with a plasticizer of this invention, which is a mixture of alkyl alkylaryl adipate and dialkyl adipate. Although the amount of plasticizer used can vary as a function of the plasticized PVB properties that are desired, the plasticizer content of the PVB-plasticizer mixture is preferably between about 15 and 65%.

The plasticizing of the PVB resin may be carried out by any standard method known in the art. For example, the PVB resin may be placed in a mixer and the plasticizer added gradually. The mixing process can be performed at ambient temperatures for about 30 minutes, or at higher temperatures.

Alternatively, the plasticizing method described in French Pat. No. 2,235,163 may be used. The mixers described in an article "Preparation des mélanges" appearing in the journal "Les Techniques de l'Ingenieur" (reference J. 1930 pgs. 1–6, May 1965) may also be used in the mixing process.

In the tests and the following examples, after mixing the PVB resin with the plasticizer, the plasticized PVB obtained was extruded to form sheets having a thickness of 0.76 mm. Sheets of this type are advantageously used as insert layers in laminated glass.

In all of the tests, laminated glass samples were prepared in the following manner. A 0.76 mm thick sheet of plasticized polyvinyl butyral was preconditioned in a moist environment and then placed between two glass sheets measuring 30.5×30.5 cm and having a thickness of 3 mm. The samples were subsequently compressed in an autoclave for 20 minutes at a temperature of 138° C. and a pressure of 10 bars. The glass samples were then divided into three groups and each group was conditioned for 24 hours at a pre-determined temperature of −20° C., −10° C. or 20° C.

RESILIENCE AT DIFFERENT TEMPERATURES

In the first cold resilience test, a 2.270 kg steel ball was dropped onto the center of a laminated glass sample resting on a wooden frame. The laminated glass samples contained various PVB plasticizers, including those of this invention.

The test was carried out at −20° C., and the approximate height at which 90% of the laminated glass samples withstood the impact of the ball drop was determined. The results of this test are recorded in Table I.

In the second cold resilience test, a 0.227 kg steel ball having a diameter of 38 mm was dropped a distance of 10 m onto the center of a laminated glass sample resting on a wooden frame. The test was run at −10° C. and at +20° C.

The samples were subsequently examined to determine (1) whether or not the projectile penetrated the glass; (2) the mass of glass detached by the impact; (3) whether tears or cracks were produced in the plasticized PVB interlayer by the impact.

The test results were considered to be good if the mass of the glass detached after impact was less than 25 g, or if the ball did not penetrate the laminated glass. The presence of a crack in the sample indicated a lower level of cold resilience. The results of this test appear in Table II.

HEAT RESISTANCE

Three separate heat resistance tests were performed. Their results are shown in Table III.

In the boiling water test, laminated glass samples, some of which comprised the plasticized PVB of this invention, were placed in boiling water for 2 hours. The samples were then examined and the presence or absence of bubble formation within the laminated glass was recorded. Bubble-free samples were again placed in boiling water for 4 more hours, after which they were again examined.

In the dry heat test, laminated glass samples were placed in a dry oven at 120° C. for 30 minutes. The samples were then examined for the presence or absence of bubble formation. Bubble-free samples were put back in the oven for 2 hours and again observed.

In the moist heat test, laminated glass samples were vertically suspended for 2 weeks in a sealed enclosure with an ambient humidity of 100% and a temperature of 55° C. At the end of the test period, the samples were examined for bubble formation, delamination of the peripheral areas, and formation of a white film in the peripheral areas.

EXAMPLES

The following examples illustrate the good edge stability, heat resistance and cold resilience properties exhibited by laminated glass containing polyvinyl butyral sheets plasticized with the mixture of alkyl alkylaryl adipate and dialkyl adipate disclosed by this invention.

These examples are non-limiting and are presented to illustrate the advantages of the mixture of alkyl alkylaryl adipate and dialkyl adipate when used as a plasticizing agent for PVB resins.

The following list indicates the significance of the abbreviations used in the examples:

| | |
|---|---|
| BOA | benzyl octyl adipate |
| n.DAA | di-n-amyl adipate or di-n-pentyl adipate |
| n.DHA | di-n-hexyl adipate |
| BBP | butyl benzyl phthalate |
| 3GH | triethylene glycol di(2-ethylbutyrate) |
| T.O.F. | trioctyl phosphate |

EXAMPLES 1 TO 8

Examples 1 to 8 in Table I illustrate the improved level of cold resilience demonstrated by laminated glass containing PVB interlayers that have been plasticized with a mixture of adipates according to this invention.

TABLE I

| Ex- am- ples | Nature of Plasticizers (1) | (2) | Ratio Between Plasticizers ($\frac{1}{2}$) | Total Plasticizers as % of Resin (p.c.r.) | Test of 2.270 kg Ball Drop (in meters) −10° C. | +20° C. |
|---|---|---|---|---|---|---|
| 1 | BOA | — | — | 37 | 2.7 | 7.2 |
| 2 | n.DHA | — | — | 37 | 2.4 | 7.5 |
| 3 | n.DAA | — | — | 37 | 3.6 | 4.8 |
| 4 | BBP | — | — | 40 | 0.3 | 7.5 |
| 5 | BOA | n.DHA | 80/20 | 37 | 3.6 | 6.6 |
| 6 | BOA | n.DAA | 80/20 | 37 | 4.8 | 6.6 |
| 7 | n.DHA | BBP | 80/20 | 37 | 2.1 | 6.9 |
| 8 | 3GH | — | — | 41 | 2.7 | 6.6 |

Column 1 of the table indicates the example number. The second and third columns indicate the nature of the plasticizers added to the PVB resin and the 4th column lists the ratio of these plasticizers in the sample mixture. Column 5 indicates the total plasticizer content expressed as a percentage of the resin (p.c.r.). Columns 6 and 7 record the results of the ball drop tests conducted at −10° C. (column 6) and at +20° C. (column 7). The results, expressed in meters, represent the approximate height at which 90% of the test samples withstood the impact of the ball drop.

Table I demonstrates the improved cold resilience achieved by the use of the unique plasticizer mixture of this invention. The mixture of benzyl octyl adipate with di-n-hexyl or di-n-pentyl adipate gives a laminate with a cold resilience at −10° C. that is greater than that obtained when either the mixed adipate plasticizers or dialkyl adipate plasticizers are used separately (see examples 1, 2, 3, 5, 6). This improvement is unexpected in view of the well known fact that a mixture of plasticizers generally provides a cold resilience level that is between those provided by each of the plasticizers when used separately. For example, the mixture of di-n-hexyl adipate and butyl benzyl phthalate (example 7) gives a cold resilience level that falls between those given by each of the plasticizers when used alone (examples 2, 4).

EXAMPLES 9 TO 20

Examples 9 to 20 illustrate the cold resilience observed at a low temperature when a 0.227 kg steel ball with a diameter of 38 mm is dropped a distance of 10 m onto a laminated glass sample. The test results appear in Table II.

TABLE II

| | Nature of Plasticizers | | Ratio Between Plasticizers | Total Plasticizers as % of Resin | Test of 0.227 kg Ball Drop at −°° C. | | |
|---|---|---|---|---|---|---|---|
| Examples | (1) | (2) | (½) | (p.c.r.) | Gone Through | Cracked | Without Crack |
| 9 | BOA | — | — | 38 | 1/6 | 4/6 | 1/6 |
| 10 | n.DHA | — | — | 34 | 1/6 | 3/6 | 2/6 |
| 11 | BBP | — | — | 40 | 6/6 | — | 0/6 |
| 12 | BOA | n.DAA | 80/20 | 37 | 0/6 | 0/6 | 6/6 |
| 13 | BOA | n.DAA | 75/25 | 37 | 0/6 | 1/6 | 5/6 |
| 14 | BOA | n.DAA | 70/30 | 37 | 0/6 | 1/6 | 5/6 |
| 15 | BOA | n.DAA | 65/35 | 37 | 0/6 | 1/6 | 5/6 |
| 16 | BOA | n.DAA | 50/50 | 37 | 0/6 | 1/6 | 5/6 |
| 17 | BOA | n.DHA | 65/35 | 37 | 0/6 | 0/6 | 6/6 |
| 18 | BOA | n.DHA | 50/50 | 35 | 0/6 | 2/6 | 4/6 |
| 19 | BOA | n.DHA | 50/50 | 37 | 1/6 | 2/6 | 3/6 |
| 20 | n.DHA | BBP | 80/20 | 37 | 4/6 | 2/6 | 0/6 |

Columns 1 to 5 of Table II parallel those of Table I. Columns 6, 7, and 8 indicate the results after impact of the 0.227 kg steel ball. Column 6 lists the number of laminated glass samples that were penetrated by the steel ball—in relation to the number of trials conducted. Column 7 lists the number of glass samples in which the plasticized PVB layer was cracked—in relation to the number of trials conducted. Column 8 lists the number of laminated glass samples that did not sustain either a crack or a detachment of glass with a mass greater than 25 g after the impact—in relation to the number of trials conducted.

Table II, and particularly examples 12 to 19, demonstrate the high level of cold resilience of laminates containing a PVB layer that has been plasticized with the mixture of adipates disclosed by this invention.

EXAMPLES 21 TO 31

Examples 21 to 31 and Table III illustrate the heat resistance properties of laminates containing PVB interlayers plasticized with the mixture of adipates of this invention.

TABLE III

| | Nature of Plasticizers | | Ratio Between Plasticizers | Total Plasticizers as % of Resin | Boiling Water Test | Dry Heat Test | Moist Heat Test |
|---|---|---|---|---|---|---|---|
| Examples | (1) | (2) | (½) | (p.c.r.) | | | |
| 21 | BOA | — | — | 37 | Good | Good | + |
| 22 | n.DAA | — | — | 37 | Bubbles | Bubbles | 0 |
| 23 | n.DHA | — | — | 37 | Good | Good | 0 |
| 24 | BOA | n.DAA | 80/20 | 37 | Good | Good | + |
| 25 | BOA | n.DAA | 70/30 | 37 | Good | Good | + |
| 26 | BOA | n.DHA | 80/20 | 37 | Good | Good | + |
| 27 | BOA | n.DHA | 65/35 | 37 | Good | Good | + |
| 28 | BOA | n.DHA | 50/50 | 35 | Good | Good | + |
| 29 | T.O.F. | — | — | 37 | Good | Good | + |
| 30 | BOA | T.O.F. | 80/20 | 37 | Bubbles | Bubbles | + |
| 31 (control) | 3GH | — | — | 41 | Good | Good | 0 |

Moist Heat Test:
0 = equivalent to control - formation of a white strip on periphery which subsequently disappears; no delamination
+ = better than control
− = worse than control In Table III, columns 1 to 4 have the same significance as those in Tables I and II. Column 5 indicates the results of the boiling water test, column 6 lists the results of the dry heat test, and column 7 contains data from the moist heat test.

The results demonstrate the high level of heat resilience permitted when mixed adipate plasticizers are used. In particular, the mixed adipate plasticizers of this invention provide heat properties far above those provided by dialkyl adipate plasticizers when used alone.

AGING IN WEATHER STATION TEST

Laminated glass samples prepared with various PVB interlayers were placed in a weather station and observed over a period of six months. Samples prepared with a PVB insert plasticized with the adipate mixtures of this invention, such as benzyl octyl adipate and di-n-pentyl adipate or benzyl octyl adipate and di-n-hexyl adipate did not exhibit any signs of aging or alteration. In contrast, the samples prepared with a PVB insert that was plasticized with di-n-pentyl adipate did show signs of aging.

This invention also contemplates the use of various additives in conjunction with the plasticizers of this invention. Possible additives include dyes, pigments, stabilizers, anti-oxidants, anti-ultraviolet agents and adherence modifiers.

I claim:

1. A method for plasticizing polyvinyl butyral which comprises admixing polyvinyl butyral with a plasticizer mixture of:
   (a) at least one alkyl alkylaryl adipate having the general formula:

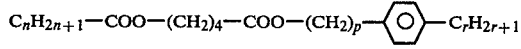

wherein n is greater than or equal to 1 and the sum of p+r is greater than or equal to 1; and
   (b) at least one dialkyl adipate in which the alkyl group contains from 3 to 8 carbon atoms,
   wherein the alkyl alkylaryl adipate comprises between about 50 and 80% by weight of the total plasticizer mixture.

2. The method according to claim 1, wherein the alkylaryl group of the alkyl alkylaryl adipate is benzyl and n is between 2 and 10.

3. The method according to claim 2, wherein the alkyl alkylaryl adipate is benzyl octyl adipate, benzyl hexyl adipate, benzyl butyl adipate, or benzyl decyl adipate.

4. The method according to claim 3, wherein the dialkyl adipate is di-butyl adipate, di-n-pentyl adipate, di-n-hexyl adipate, or di-n-heptyl adipate.

5. The method according to claim 1, wherein the mixture comprises benzyl octyl adipate and di-n-pentyl adipate.

6. The method according to claim 1, wherein the mixture comprises benzyl octyl adipate and di-n-hexyl adipate.

7. The method according to claim 1, wherein the polyvinyl butyral resin has a molecular weight between about 30,000 to 600,000, a 0 to 10% content by weight of residual ester groups, calculated as polyvinyl acetate, and a 12 to 25% content by weight of hydroxyl groups, calculated as polyvinyl alcohol.

8. The method according to claim 1, wherein the plasticizer content of the polyvinyl butyral-plasticizer mixture is between about 15 and 65%.

9. A laminated safety glass comprising two sheets of glass having between the glass surfaces a sheet of polyvinyl butyral plasticized with a plasticizer mixture of:
   (a) at least one alkyl alkylaryl adipate having the general formula:

wherein n is greater than or equal to 1 and the sum of p+r is greater than or equal to 1; and
   (b) between about 50 and 20% of at least one dialkyl adipate in which the alkyl group contains from 3 to 8 carbon atoms,
   wherein the alkyl alkylaryl adipate comprises between about 50 and 80% by weight of the total plasticizer mixture.

10. The laminated safety glass according to claim 9, wherein the alkylaryl group of the alkyl alkylaryl adipate is benzyl and n is between 2 and 10.

11. The laminated safety glass according to claim 10, wherein the alkyl alkylaryl adipate is benzyl octyl adipate, benzyl hexyl adipate, benzyl butyl adipate, or benzyl decyl adipate.

12. The laminated safety glass according to claim 11, wherein the dialkyl adipate is di-butyl adipate, di-n-pentyl adipate, di-n-hexyl adipate, or di-n-heptyl adipate.

13. The laminated safety glass according to claim 9, wherein the plasticizer mixture comprises benzyl octyl adipate and di-n-pentyl adipate.

14. The laminated safety glass according to claim 9, wherein the plasticizer mixture comprises benzyl octyl adipate and di-n-hexyl adipate.

15. A composition of matter comprising a polyvinyl butyral resin plasticized with a plasticizer mixture of:
   (a) at least one alkyl alkylaryl adipate having the general formula:

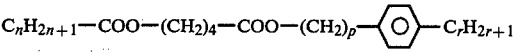

wherein n is greater than or equal to 1 and the sum of p+r is greater than or equal to 1; and
   (b) at least one dialkyl adipate in which the alkyl group contains from 3 to 8 carbon atoms,
   wherein the alkyl alkylaryl adipate comprises between about 50 and 80% by weight of the total plasticizer mixture.

16. The composition of matter according to claim 15, wherein the alkylaryl group of the alkyl alkylaryl adipate is benzyl and n is between 2 and 10.

17. The composition of matter according to claim 16, wherein the alkyl alkylaryl adipate is benzyl octyl adipate, benzyl hexyl adipate, benzyl butyl adipate, or benzyl decyl adipate.

18. The composition of matter according to claim 17, wherein the dialkyl adipate is di-butyl adipate, di-n-pentyl adipate, di-n-hexyl adipate, or di-n-heptyl adipate.

19. The composition of matter according to claim 15, wherein the plasticizing mixture is present in an amount of between 15 and 65% by weight of the total weight of the plasticized polyvinyl butyral resin.

* * * * *